INVENTOR
HENDRIK F. BOK
EDWARD BOK
BY JOHN GIBSON SEMMES
ATTORNEY

INVENTOR
HENDRIK F. BOK
EDWARD BOK
BY JOHN GIBSON SEMMES
ATTORNEY

United States Patent Office 2,980,339
Patented Apr. 18, 1961

2,980,339
PAINT SPRAYING APPARATUS

Hendrik Frederik Bok and Edward Bok, Amsterdam, Netherlands (both of The Lofstrand Co., Southlawn Lane, Rockville, Md.)

Filed Mar. 10, 1959, Ser. No. 798,509

12 Claims. (Cl. 239—135)

This invention relates to a paint spraying apparatus, including an evaporation device for the formation of a spraying medium which is derived from a volatile thinner for the paint. This application is related to co-pending application Serial No. 772,084, filed November 5, 1958, by the inventors herein.

If in a paint spraying apparatus the paint is sprayed cold, the application of hot vapor as a spraying medium will in general result in a lowering of the viscosity of the paint, which facilitates paint spray. However, for paints having very high viscosities the viscosity must be lowered additionally by the admixture of solvents and thinners.

Owing to this necessary admixing of solvents and thinners, a paint mixture will result in which the solid substances form only a small percentage and which, therefore, displays important disadvantages in spraying. For example, if a somewhat too thick paint layer has been applied to the surface to be sprayed, settling of the paint will occur, which settling affects the appearance unfavorably.

It is a primary object of the invention to make possible the spraying of high-viscosity paints with strongly reduced consumption of solvents and thinners, in which way the inherent disadvantages are removed.

To this end the paint spraying apparatus according to the invention is characterized by the fact that the paint passes between the paint supply tank and the spray-gun— through a heat exchanger placed in the evaporation device.

Here it may be remarked that in the British Patent 595,212 a paint spraying apparatus is described, in which the paint is sprayed with the help of air. This air is compressed in a compressing machine and then heated in a heating device. The paint to be sprayed, before being passed to a spray-gun, is preheated in a heat exchanger, through which the heated compressed air flows, and in which the heat of the compressed air is transferred to the paint.

However, this known device is intricate, whilst moreover a relatively lower useful heat effect is obtained and, owing to flow-resistance in the heat exchanger, a loss of pressure will prevail in the spraying medium.

According to the instant invention a heat exchanger is placed within the spraying medium evaporation chamber, which arrangement has considerable advantages. In this way a compact structure is obtained, whilst thermal losses in the heat exchanger are excluded, the heat exchanger on the one hand being traversed by the paint and on the other hand, being surrounded by the heated spraying medium in liquid and/or vapor form. In the evaporation chamber high temperatures will prevail when the paint spraying apparatus is in operation, to the extent that the liquid spraying medium present will have a temperature which is somewhat lower than its boiling point corresponding to the service pressure applied, whilst the vapor evolved can be superheated to considerably higher temperatures by means of the part of the heating element protruding above the liquid level.

If heating to about the evaporation temperature of the spraying medium liquid is sufficient to obtain a low viscosity of the paint, a construction may be applied in which the heat exchanger is completely surrounded by the evaporation liquid. If, however, preheating to a higher temperature is required to obtain a paint of sufficient viscosity for spraying, the heat exchanger can partly be extended in the vapor space of the heating device.

In a successful embodiment of the instant paint spraying apparatus a by-pass conduit has been installed parallel to the heat exchanger. The flow-capacity of this by-pass is readily controlled. Thus a simple temperature control of the paint to be sprayed may be obtained. If the by-pass is closed, all the paint flowing to the spray-gun will pass through the heat exchanger, whilst with a partly or wholly open by-pass at least part of the paint will follow the by-pass conduit. In this latter manner the paint heated in the heat exchanger will mix with the paint flowing via the by-pass, so that paint of an intermediate temperature will reach the paint-gun. The temperature of the paint passed to the spray-gun can therefore be accurately adjusted by controlling the flow-rate of the by-pass conduit.

Below the invention will be described with the help of the attached drawings, illustrating a constructional example of the invention. Several additional features can be applied to the apparatus with advantage, are also described.

Figure 1:
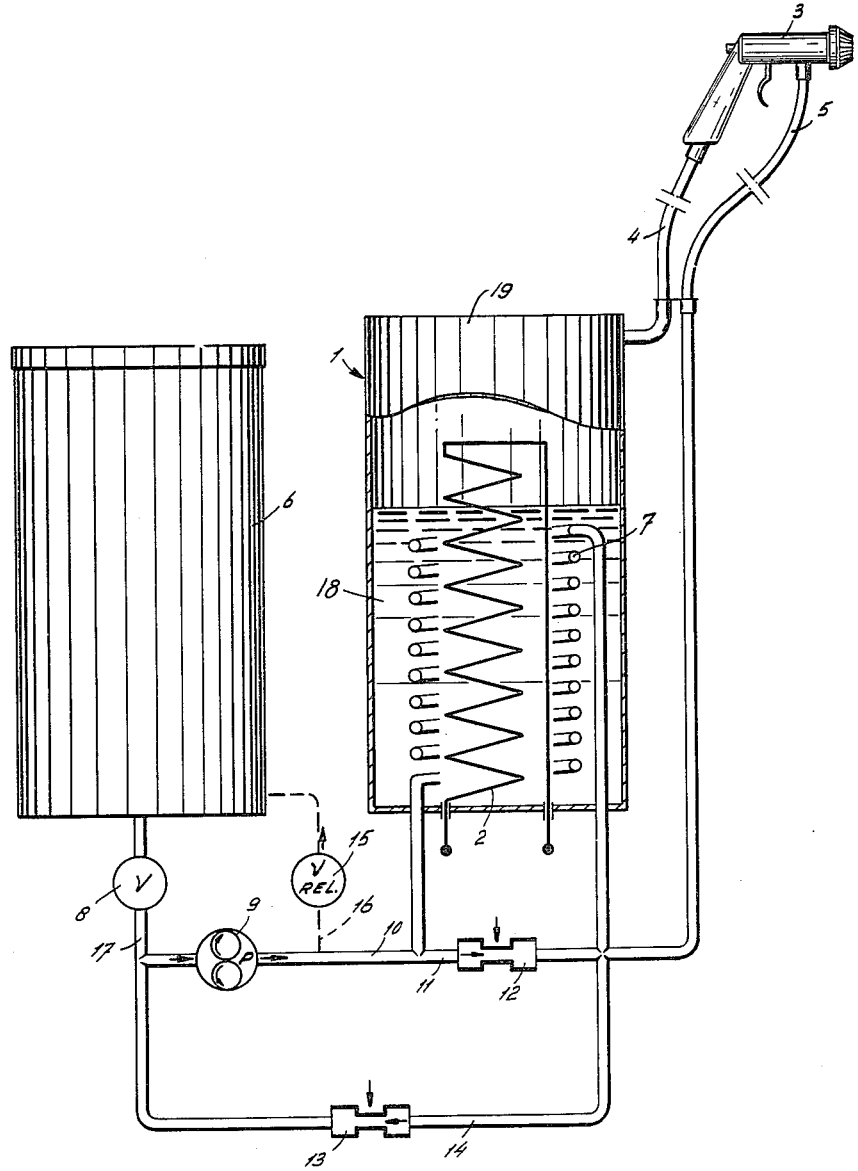
Figure 1 shows a schematic illustration of a paint spraying apparatus, constructed according to the instant invention.

In Figure 1 a construction of the paint spraying apparatus according to the instant invention is shown. This apparatus is provided with an evaporation device 1 for the developing of a spraying medium by evaporating a volatile liquid 18, in particular a hydrocarbon with low and narrow boiling range, such as petroleum spirits, with the help of an electric heating element 2 immersed in tank 19.

The spraying medium hot vapor is passed to paint spray-gun 3 via a flexible tubing or conduit 4. This conduit designated as spraying medium conduit 4, may be provided with a heating element or jacket in order to prevent condensation of the vapor within. Paint supply conduit 5 leading from supply tank 6 is also connected to spray gun 3.

Within evaporator 1 high liquid and vapor temperatures will prevail during operation of the paint spraying apparatus. These temperatures will be almost constant. The temperature of the spraying medium liquid is dependent upon heating element 2, as well as the spraying pressure applied and the boiling point of the liquid to be evaporated at this pressure. The temperature of the vapor on the other hand, depends on the degree of superheating which is applied.

When applying petroleum spirits as the liquid to be evaporated under a spraying pressure of 3 atmospheres, a liquid temperature of about 80° C. will be maintained in evaporator 1.

In this invention vapor temperature can be utilized for heating the paint which is passed to the spray-gun 3. This utilization makes it possible to spray paints of higher viscosity without making use of solvents and thinners. To this end a heat exchanger 7 is installed between the paint supply tank 6 and the conduit 5. Heat exchanger 7 is mounted within evaporator 1.

This helically shaped heat exchanger 7, through which the paint can be passed, is located completely under the volatile liquid level in the illustrated construction, so that the heat of the volatile liquid is transferred to the paint.

If a higher paint temperature is required, it is also possible to make the heat exchanger 7 protrude partly above the liquid level in the evaporator 1, so that part of the heat exchanger 7 is surrounded by superheated vapor. A heat exchanger 7, thus exposed, is heated to a higher temperature than an exchanger submerged entirely in the volatile liquid. Manifestly, the volatile liquid can only be heated to a temperature below its corresponding boiling point.

In the instant paint spraying apparatus paint is sucked from supply tank 6 via a suction conduit 17 provided with valve 8. Pump 9, which may or may not be a gear pump provided with a drive (not illustrated) may be used for suction purposes. Pump 9 presses the paint into conduit 10, which is connected in turn with the heat exchanger 7. Having passed through the heat exchanger 7 the paint is forced via paint supply conduit 5 to spray-gun 3.

In order to control heating of the paint, a by-pass 11 is connected with the pressure conduit 10 and paint supply conduit 5, parallel to the heat exchanger 7. Flow-rate through the bypass can be controlled with the aid of a cock 12. If cock 12 is completely closed, all the paint supplied to the spray-gun will pass through heat exchanger 7, which results in the highest possible heating of the paint. Whereas, in the fully open position of cock 12 practically all the paint is passed to spray-gun 3 via by-pass 11. The paint meets less resistance via by-pass 11 than via the heat exchanger 7, so that with cock 12 fully open practically no heating of the paint will take place.

With cock 12 partially opened part of the paint will pass through heat exchanger 7, whereas the remainder of the paint passes through the by-pass 11. After passing separately through by-pass 11 and heat exchanger 7, the paint is mixed in conduit 5 and, as a result, paint of an intermediate temperature is supplied to spray-gun 3.

To make pressure control possible in the supply conduit 5, connection with suction conduit 17 is provided by return conduit 14, equipped with a cock 13. The return conduit 14 alternatively may be connected with paint supply tank 6. In this latter case, preheating of the paint present in paint supply tank 6 will take place, but when a thinner is applied to the paint within tank 6 this implies the danger that, owing to this heating, evaporation of the thinner may occur.

If cock 13 is closed, the pressure in supply conduit 5 to spray-gun 3 can rise up to the pressure level at which back flow valve 15 will open. Back flow valve 15 is placed in back flow conduit 16 which connects the pressure conduit 10 to paint tank 6 (or to suction conduit 17).

If cock 13 in return conduit 14 is opened, the quantity of paint forced by pump 9 into pressure conduit 10, and which is not passed off through the spray-gun 3, can flow back via return conduit 14 into the suction conduit 17. The pressure of the paint in supply conduit 5 and spray-gun 3 is in such case mainly determined by the flow resistance in the cock 13 and can, obviously, not amount to a higher value than that at which the back-flow valve 15 opens. In tests highly satisfactory results have been obtained when applying a pressure control valve 15 which opens at 2 atmospheres. Under these conditions paint supply pressure in the paint supply conduit 5 and in paint spray-gun 3 can be controlled between about 0 and 2 atmospheres with the aid of cock 13 in return conduit 14.

As long as the paint spray-gun is not operated the paint, which is sucked up by the pump 9 via the suction conduit 17 from the supply tank 6 and forced into the pressure conduit 10, can circulate through the return conduit 14 and/or the back flow conduit 16, during which, when the cock 12 in the by-pass is in the closed position, the paint is preheated.

When paint-spray gun 3 is opened, the paint will be sprayed with the help of the spraying medium, which is supplied via conduit 4 to the spray-gun 3. Here the continuously operating pump 9 supplies the paint to be sprayed from the supply tank 6, whilst the paint supplied in excess flows back via return conduit 14 to the suction side of the pump 9.

Figure 2:
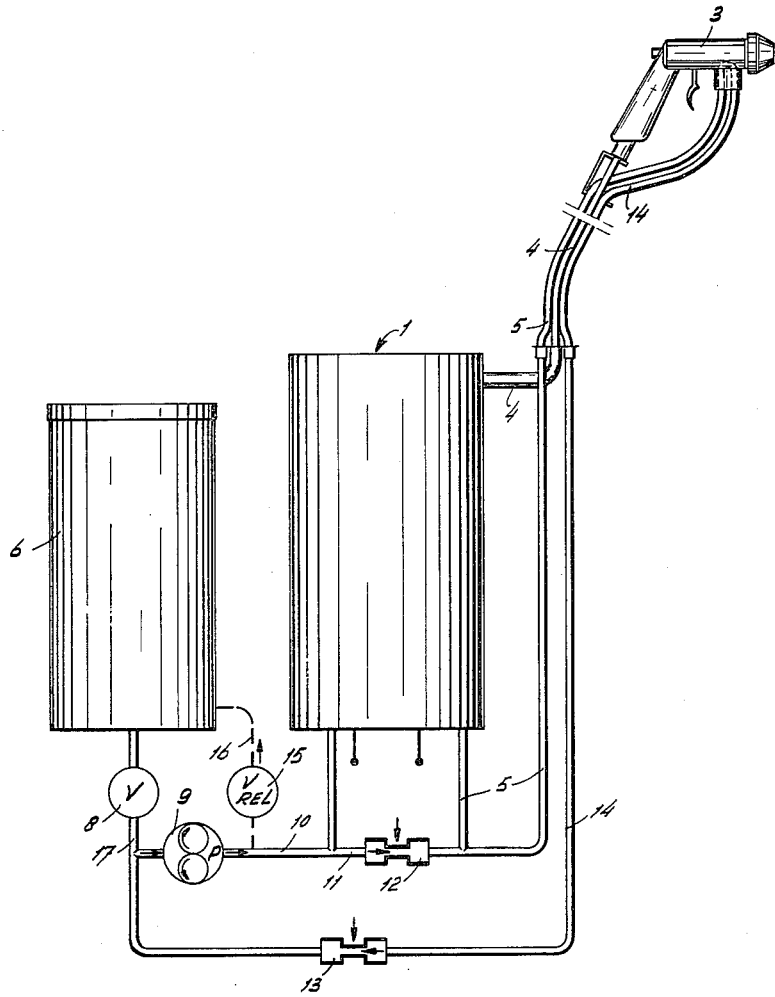
Figure 2 shows a schematic illustration of a modified construction of the paint spraying apparatus.

In Figure 2 a modified form of construction of the paint spraying apparatus, according to the instant invention is presented. In this modification return conduit 14 is connected with spray-gun 3, and the paint to be passed back through this conduit 14 passes through spray-gun 3. In this way it is possible to preheat spray-gun 3 by the circulation of the heated paint, before the spraying operation proper is set in. As a result of this pre-heating condensation of the spraying medium in spray-gun 3 is prevented completely or at least to a considerable extent. Without pre-heating condensation would take place, especially in the initial period of use when spray-gun 3 is still cold.

Further flexible tubing or conduit 4, through which the spraying medium is passed from evaporator 1 to spray-gun 3, is brought into contact with the paint supply conduit 5 and with the paint return conduit 14 over a considerable portion of its length. Thus, paint heated in heat exchanger 7 and circulating through supply and return conduits 5 and 14 respectively, can transfer heat to spraying medium conduit 4.

In this way an effective heating of spraying medium conduit 4 is realized and there is prevented condensation of the spraying medium being conveyed therein. This modification eliminates, therefore, the necessity for providing the spraying medium conduit 4 with a separate heating element.

The invention is not restricted to the illustrated constructional examples, which can be varied in numerous respects within the limits of the invention.

We claim:

1. A paint spraying apparatus comprising a paint supply source, a spray gun and an evaporating device interconnecting said supply source and said spray gun, said evaporating device having mounted therein a heating element for the formation of a spraying medium by the evaporation of a volatile liquid and a heat exchanger through which said paint is conveyed.

2. A paint spraying apparatus as in claim 1, said heat exchanger being totally immersed in said volatile liquid.

3. A paint spraying apparatus as in claim 1, said heating element being partially immersed in said volatile liquid and extending into a vapor space above said volatile liquid.

4. A paint spraying apparatus as in claim 1, said heat exchanger comprising a helically wound tubing encircling said heating element and connecting said paint supply source with said spray gun.

5. A paint spraying apparatus comprising a paint supply tank, a spray gun and an evaporating device mounted between said supply source and said spray gun, said evaporating device having mounted therein a heating element for the formation of a spraying medium by the evaporation of a volatile liquid and a heat exchanger conduit encircling said heating element and connecting said evaporator with said spray gun, including a paint supply conduit with continuously operating pump means interconnecting said supply source and said evaporator, and a backflow conduit with valve interconnecting a pressure side of said supply conduit with said paint supply source and a suction side of said supply conduit.

6. A paint spraying apparatus as in claim 5, including regulable by-pass means in said paint supply conduit attached parallel to said heat exchanger.

7. A paint spraying apparatus comprising a paint supply tank connected to a spraying gun by means of a paint supply conduit, an evaporating device connected to said spray gun by means of a spraying medium supply conduit and enveloping a heat exchange portion of said supply conduit, said evaporating device further including a tank having a heating element therein for the formation of a spraying medium by the evaporation of a volatile liquid, continuously operating pump means fixed in said paint supply conduit between said paint supply tank and said heat exchange portion of said paint supply conduit, a backflow conduit with valve interconnecting the pressure side of said paint supply conduit and said supply tank, by-pass means attached in said paint supply conduit parallel to said heat exchange portion and a paint return conduit interconnecting said by-pass and said heat exchange portions of said paint supply conduit with the suction side of said pump means in said paint supply conduit and thus with said supply tank.

8. A paint spraying apparatus as in claim 7, including means for regulating the rate of flow in said paint return conduit.

9. A paint spraying apparatus comprising a paint supply tank connected to a spraying gun by means of a paint supply conduit, an evaporating device connected to said spray gun by means of a spraying medium supply conduit and enveloping a heat exchange portion of said paint supply conduit, said evaporating device further including a tank having a heating element therein for the formation of a spraying medium by the evaporation of a volatile liquid, continuously operating pump means fixed in said paint supply conduit between said paint supply tank and said heat exchange portion of said paint supply conduit, a backflow conduit with valve interconnecting the pressure side of said paint supply conduit and said supply tank, by-pass means attached in said paint supply conduit parallel to said heat exchange portion and a paint return conduit joining said paint supply conduit in a circulation channel within said spray gun and interconnecting said channel with the suction side of said pump means in said paint supply conduit and thus with said paint supply tank.

10. A paint spraying apparatus comprising a paint supply tank connected to a spraying gun by means of a paint supply conduit, an evaporating device connected to said spray gun by means of a spraying medium supply conduit and enveloping a heat exchange portion of said paint supply conduit, said evaporating device further including a tank having a heating element therein for the formation of a spraying medium by the evaporation of a volatile liquid, continuously operating pump means fixed in said paint supply conduit between said paint supply tank and said heat exchange portion of said paint supply conduit, a backflow conduit with valve interconnecting the pressure side of said paint supply conduit and said supply tank, by-pass means attached in said paint supply conduit parallel to said heat exchange portion and a paint return conduit joining said paint supply conduit in a circulation channel within said spray gun and interconnecting said channel with the suction side of said pump means in said paint supply conduit and thus with said paint supply tank and said spraying medium supply conduit and a portion of said paint supply conduit beyond said heat exchanger, partially abutting one another.

11. A paint spraying apparatus as in claim 10, said spraying medium conduit additionally abutting a portion of said paint return conduit.

12. A paint spraying apparatus as in claim 10, said heat exchange portion of said supply conduit encircling a portion of said heating element.

References Cited in the file of this patent

UNITED STATES PATENTS

| | | |
|---|---|---|
| 2,016,407 | Wentzel | Oct. 8, 1935 |
| 2,461,766 | Peeps | Feb. 15, 1949 |
| 2,762,901 | Liedberg | Sept. 11, 1956 |